United States Patent [19]
Chitayat

[11] Patent Number: 4,744,551
[45] Date of Patent: May 17, 1988

[54] SHORT-SLIDE POSITIONING TABLE WITH RECIRCULATING BEARING

[76] Inventor: Anwar Chitayat, P.O. Box 107, Northport, N.Y. 11768

[21] Appl. No.: 15,742

[22] Filed: Feb. 17, 1987

[51] Int. Cl.⁴ .............................................. B23Q 3/02
[52] U.S. Cl. ..................................... 269/55; 384/43; 384/45
[58] Field of Search ................................ 384/43–45; 269/60, 71, 73; 33/174 TA, 1 M; 51/240 R; 108/20, 137, 143

[56] References Cited

U.S. PATENT DOCUMENTS

| | | | |
|---|---|---|---|
| 2,681,836 | 6/1954 | Jarund | 384/45 |
| 3,876,264 | 4/1975 | McCloskey | 384/43 |
| 4,013,280 | 3/1977 | Chitayat et al. | 269/60 |
| 4,652,147 | 3/1987 | Geka | 384/45 |

FOREIGN PATENT DOCUMENTS 1453495 9/1966 France ................... 384/43

Primary Examiner—Robert C. Watson
Attorney, Agent, or Firm—Thomas R. Morrison

[57] ABSTRACT

A short-slide positioning table employs precision grooves machined in opposed edges of a slide thereof for receiving preloading forces applied thereto through bearings from similar opposed grooves in arms of a U-shaped frame of a positioning table. A bearing guide moves bearings released from the downstream end of the slide to a bearing-return tube for return to the upstream end of the slide where they are again captured. Tapered transition regions at each end of each groove in the slide permit easy release and capture of the bearings. In one embodiment of the invention, a force-relief portion is disposed between two contact portions of the groove in the slide. The force-relief portion is set back from the contact portions a sufficient distance to reduce preloading forces in these regions to about zero. Tapered transition regions are provided between the contact portions and the force-relief portions.

8 Claims, 6 Drawing Sheets

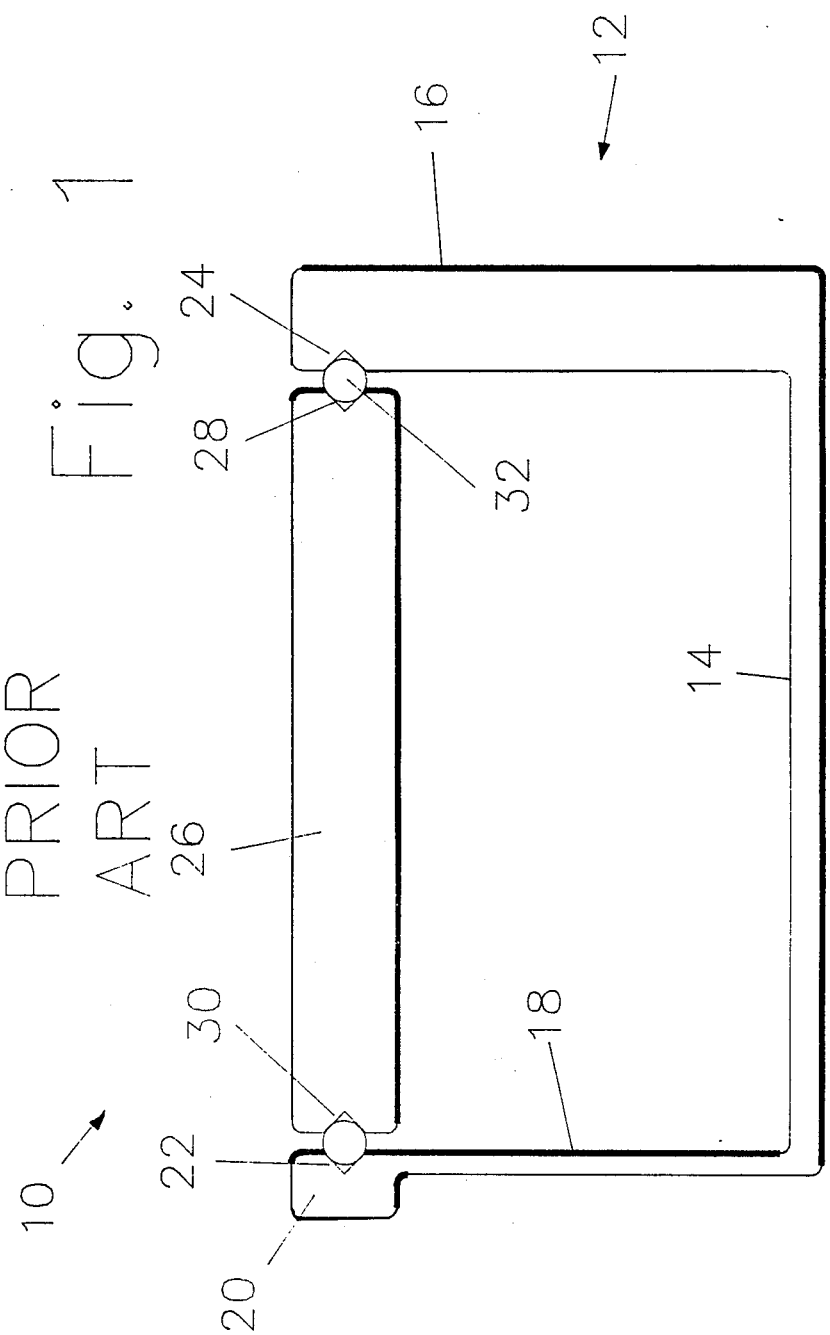

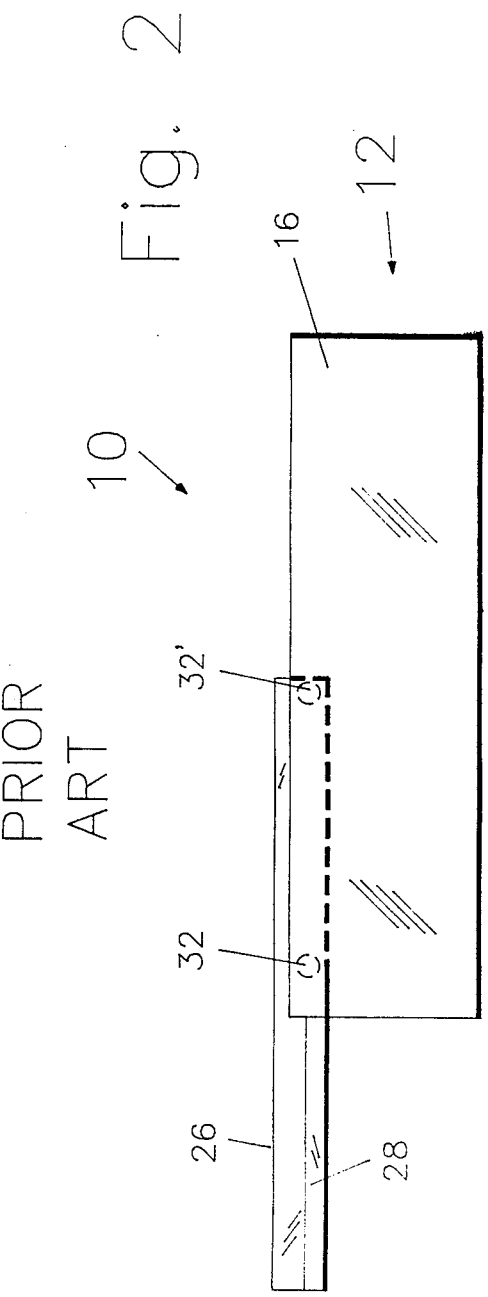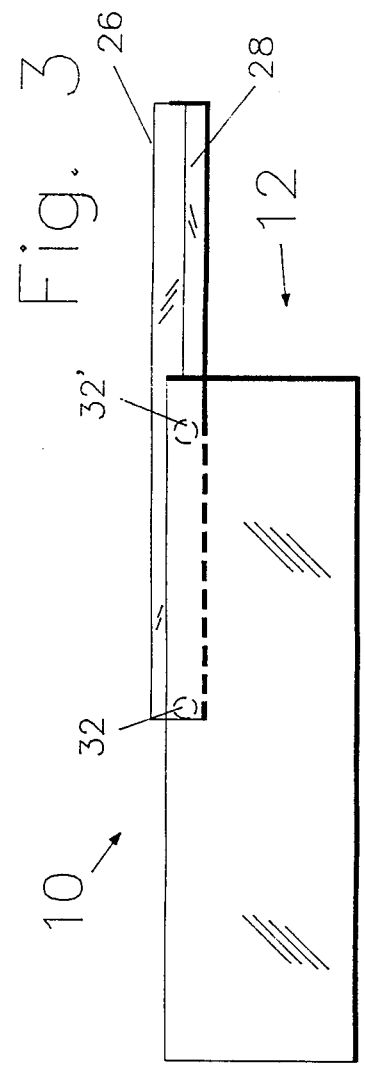

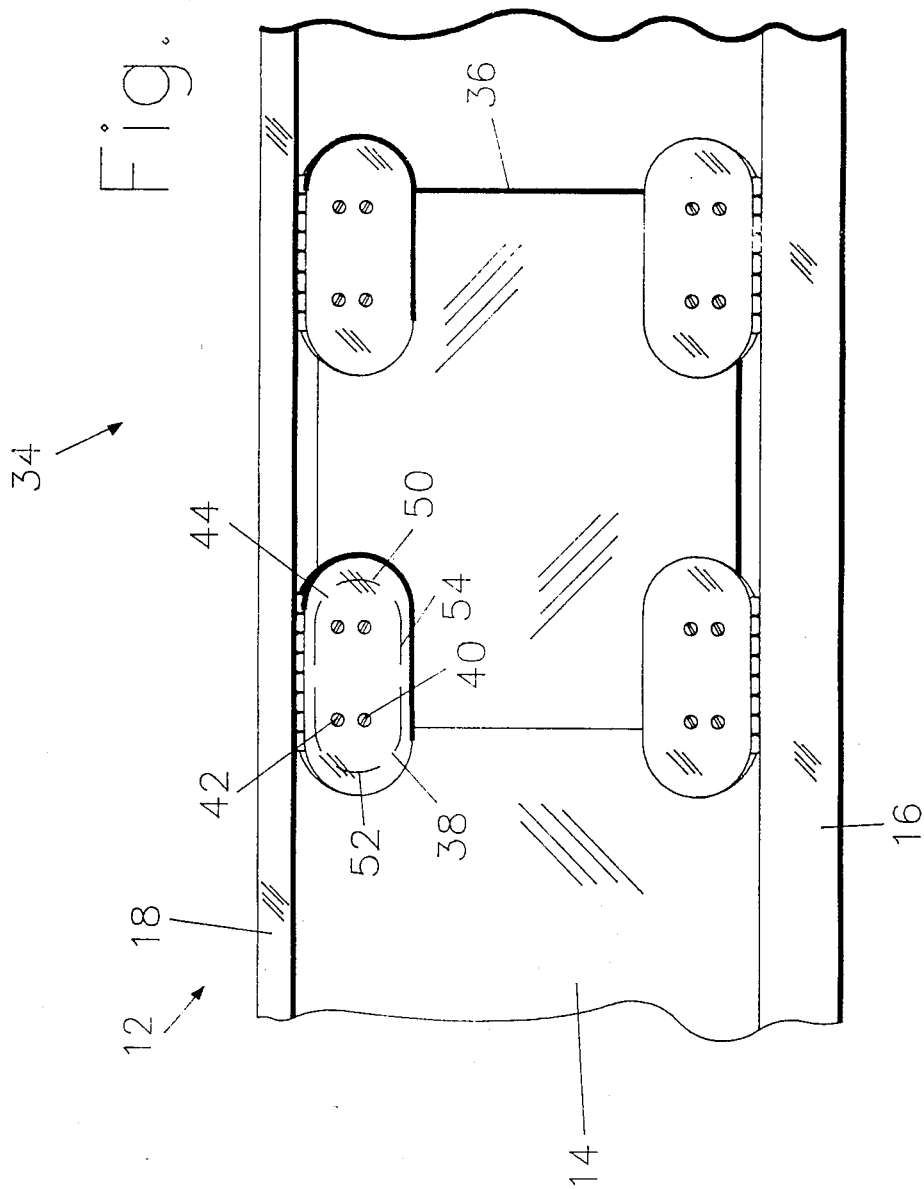

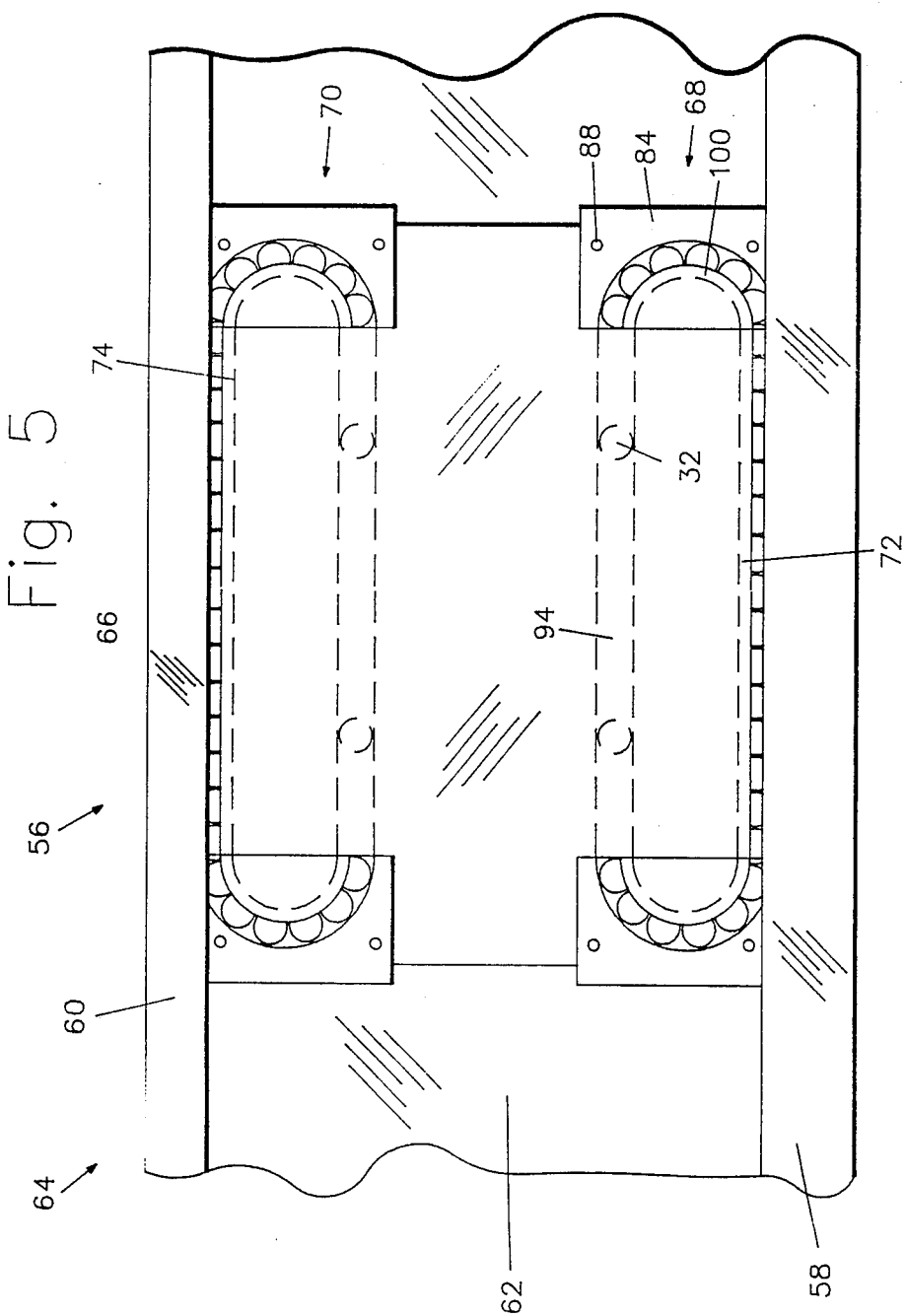

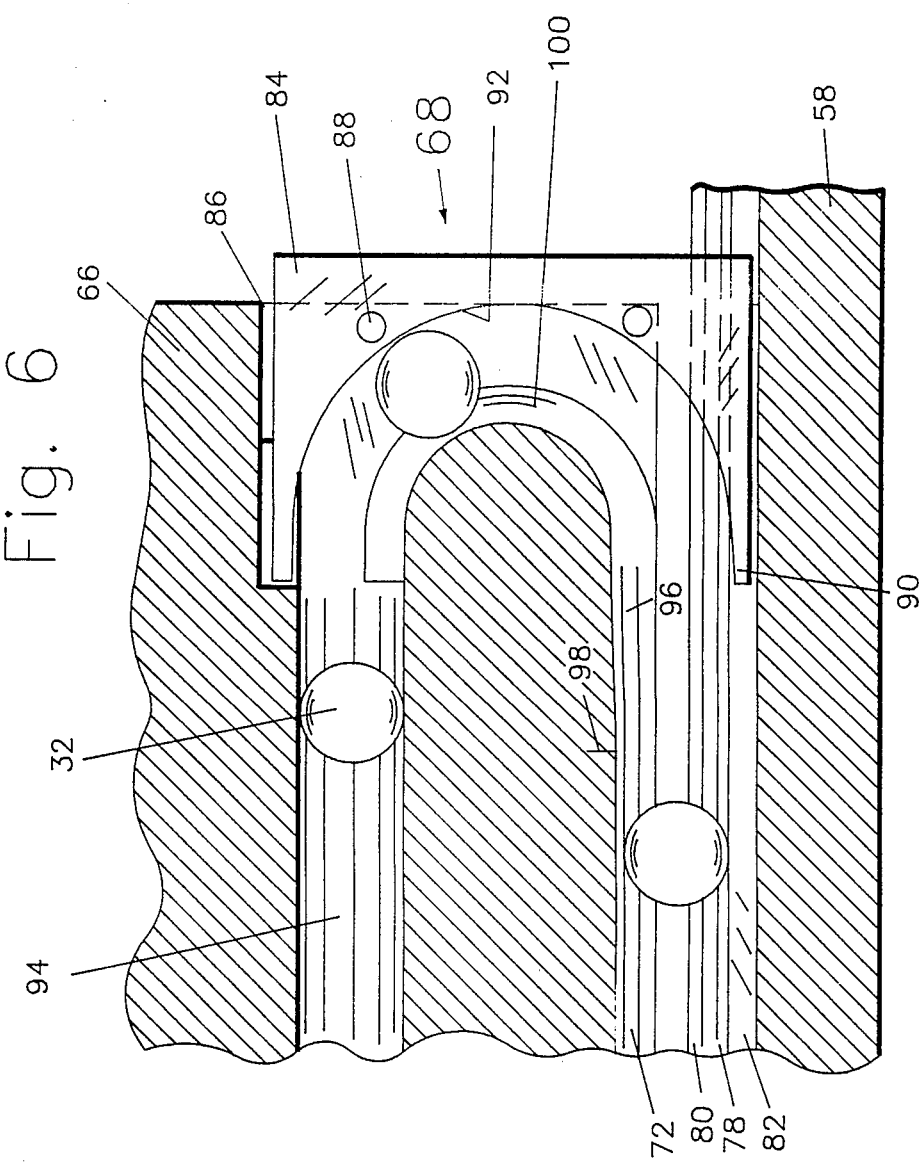

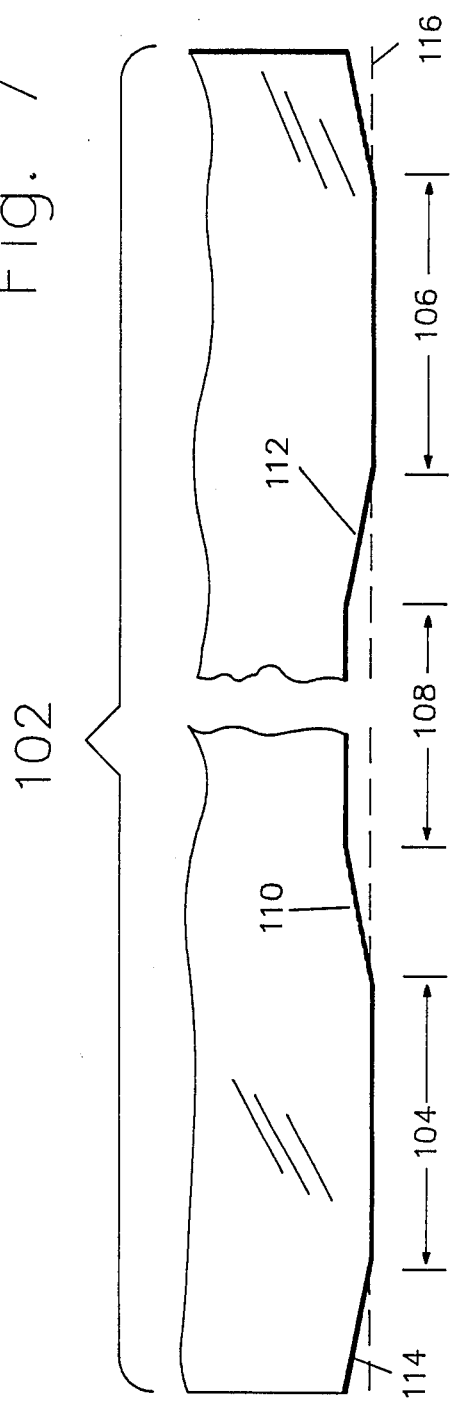

SHORT-SLIDE POSITIONING TABLE WITH RECIRCULATING BEARING

BACKGROUND OF THE INVENTION

The present invention relates to positioning tables and, more particularly, to positioning tables of a type having a slide guided for linear travel between arms of a U-shaped frame.

In my prior U.S. Pat. No. 4,013,280, I disclose a positioning table having a U-shaped frame with a first pair of grooves aligned parallel to each other in facing arms of the U shape. A table, or slide, between the arms of the U-shaped frame includes a second pair of grooves facing corresponding grooves in the arms. Ball or roller bearings engaging the facing grooves permit displacing the slide along a linear axis defined by the grooves in the frame.

One of the arms is thick enough to resist elastic deformation while the other contains a thin section effective to provide a predetermined resilience. The bearings in the grooves are slightly oversize thus elastically deforming the thin section and producing a preload on the bearings. The preload is sufficiently large that it represents the dominant force upon the bearings.

Great accuracy and repeatability is attainable in such positioning tables due to the high precision with which contacting surfaces are formed. The grooves are ground and polished to high precision. Ball or roller bearings are of similarly high precision. The preload is adjusted to precise values by control of the ball or roller bearing diameters. That is, to increase the bearing preload, a slightly larger bearing diameter is selected.

Although the above positioning table has attained a firm position in the market place, its construction presents some difficulties. Specifically, the maximum linear travel distance is limited to about 1.5 times the length of the slide. Thus, for long travel, a correspondingly long slide is required even when the work piece to be mounted on the slide may be of modest size. Also, at each extremity of its travel, about half the length of the slide is cantilevered from the frame. A minimum cantilever of about one-quarter of the length of the slide is attained when the slide is disposed in the center of its travel range.

A longer slide has a greater mass than a shorter slide. Such greater mass is in antagonism with the desire for rapid acceleration and precise positioning. Cantilevering as much as half the slide beyond the frame reduces the support for the slide and thus permits increased flexure and vibration; both of which are undesirable in a precision positioning device.

The prior art contains examples of recirculating ball or roller bearing assemblies in which a plurality of balls or rollers fills a racetrack. Balls or rollers along a bearing surface of the racetrack support the load. At the ends of the racetrack, the balls or rollers enter or leave a return curve communicating with a return channel. If a plurality of such a recirculating bearing assembly were used on a positioning table, the slide-length problem discussed above would be substantially reduced. One possibility is positioning a recirculating bearing assembly adjacent each of the four corners of the slide.

However, conventional recirculating bearing assemblies have a negative effect on precision. As noted above, part of the high precision provided by the positioning table of the referenced patent is attainable because of the ability to control tolerances in grinding and polishing the surfaces of the facing grooves. When a plurality of recirculating bearing assemblies is substituted for the grooves on the edges of the slide, it is not possible to position the bearing surfaces of the recirculating bearing assemblies with corresponding precision. As a result, the desired uniform and repeatable preload is unattainable.

OBJECTS AND SUMMARY OF THE INVENTION

Accordingly, it is an object of the invention to provide a positioning table which overcomes the drawbacks of the prior art.

It is a further object of the invention to provide a positioning table having integral recirculating bearings.

It is a further object of the invention to provide a positioning table with integral recirculating bearings in which bearing surfaces on the slide are formed in the edges of the slide.

It is a still further object of the invention to provide a positioning table with integral recirculating bearings wherein a return bearing path passes through the slide of the positioning table.

It is a still further object of the invention to provide a positioning table with integral recirculating bearings in which a single bearing surface is formed along each lateral edge of the slide.

It is a still further object of the invention to provide a positioning table with integral recirculating bearings in which a bearing surface on each side of a slide includes a relief in a center portion thereof, whereby support is localized near end portions thereof.

Briefly stated, the present invention provides a short-slide positioning table employing precision grooves machined in opposed edges of a slide thereof for receiving preloading forces applied thereto through bearings from similar opposed grooves in arms of a U-shaped frame of the positioning table. A bearing guide moves bearings released from the downstream end of the slide to a bearing-return tube for return to the upstream end of the slide where they are again captured. Tapered transition regions at each end of each groove in the slide permit easy release and capture of the bearings by the bearing guide. In one embodiment of the invention, a force-relief portion is disposed between two contact portions of the groove in the slide. The force-relief portion is set back from the contact portions a sufficient distance to reduce preloading forces in these regions to about zero. Tapered transition regions are provided between the contact portions and the force-relief portions.

According to an embodiment of the invention, there is provided a positioning table comprising: a frame, at least a first groove in the frame, a slide, at least a second groove in an edge of the slide, the second groove being disposed parallel to and facing the first groove, a plurality of bearings mutually engaging the first and second grooves, means for permitting the slide to move along an axis parallel to the first and second grooves, means for returning the bearings released from a downstream end of the first and second grooves to an upstream end thereof, and the first and second grooves accepting preload forces from the plurality of bearings therebetween.

The above, and other objects, features and advantages of the present invention will become apparent from the following description read in conjunction with

BRIEF DESCRIPTION OF THE DRAWINGS

FIG. 1 is an end view of a positioning table according to the prior art.

FIG. 2 is a side view of the positioning table of FIG. 1 at one of its extremities of motion.

FIG. 3 is a side view of the positioning table of FIGS. 1 and 2 at the other of its extremities of motion.

FIG. 4 is a top view of a positioning table supported and guided by a plurality of recirculating bearing assemblies.

FIG. 5 is a top view of a positioning table supported and guided by integral recirculating bearings according to an embodiment of the invention.

FIG. 6 is a cross section of an end portion of an integral recirculating bearing of FIG. 5.

FIG. 7 is a side view of a portion of a slide according to a further embodiment of the invention.

DETAILED DESCRIPTION OF THE PREFERRED EMBODIMENT

Referring now to FIG. 1, there is shown, generally at 10, a positioning table according to the referenced patent. A U-shaped frame 12 includes a base 14 having a thick arm 16 and a thin arm 18 upstanding therefrom. A thickened portion 20 at an extremity of thin arm 18 includes a groove 22 therein. A corresponding groove 24 in thick arm 16 is aligned with groove 22. A slide 26 positioned between thick arm 16 and thin arm 18, includes grooves 28 and 30 in opposed edges thereof. A plurality of bearings 32 are disposed between grooves 24 and 28 and between grooves 22 and 30. As will be more fully detailed hereinafter, two bearings are disposed in each pair of facing grooves.

It will be understood that conventional means may be provided for moving slide 26 with respect to U-shaped frame 12. Such conventional means may include, for example, a ball-screw drive or a linear motor (neither of which is shown). Since such drive apparatus is conventional, and forms no inventive part of the present invention, illustration and description thereof is omitted.

Since U-shaped frame 12 is a single piece, grooves 22 and 24 may be formed with high precision, both with respect to the remainder of U-shaped frame 12 and particularly with respect to each other. Similarly, since slide 26 is a single piece, grooves 28 and 30 in the edges thereof may also be formed with high precison with respect to each other. Thus, facing surfaces of all grooves have precise mutual relationships. When the high precision of the grooves is combined with correspondingly high precision in bearings 32, a total system is formed having great uniformity and precision. The resilience of thin arm 18, combined with the stiffnesses of base 14 and thick arm 16 applies a closely controlled preload on bearings 32. The preload can be adjusted by selecting bearings 32 of slightly greater or smaller diameters.

The illustrated embodiment of positioning table 10 includes balls for bearings 32. As is conventional, grooves 22, 24, 28 and 30 have an ogival cross section wherein contact between grooves and bearings takes place along pairs of lines of contact. It is equally within the contemplation of the invention that ball bearings may be replaced by rollers (not shown). Rollers are accommodated by reshaping grooves 24, 28, 30 and 32 into V shapes and positioning each roller at 90 degrees to its neighbors. Conventional carriers (not shown) may be employed to maintain spacing between the rollers. Since such techniques for employing rollers are conventional, and their substitution for balls are well known to those skilled in the art, further detailed discussion thereof is omitted.

Referring now to FIGS. 2 and 3, the limitations of slide 26 motion are illustrated. As slide 26 moves from its leftmost position illustrated in FIG. 2, to its rightmost position illustrated in FIG. 3, bearings 32 roll without slipping between the positions shown. If slide 26 is moved further leftward from its position in FIG. 2, the trailing bearing 32' loses contact with groove 28 and slide 26 is unsupported at that end. Similarly, further rightward motion of slide 26 in FIG. 3 releases the trailing bearings 32 with resulting loss of support for the trailing end of slide 26. Thus, in the extreme positions of slide 26, slightly less than half of slide 26 is cantilevered beyond support of bearings 32. With slide 26 midway between its extremities of motion, about one quarter of slide 26 is cantilevered at each end beyond support of bearings 32. Thus, the geometry of positioning table 10 limits total linear travel of slide 26 to about 1.5 times the length of slide 26.

Referring now to FIG. 4, a positioning table 34 is shown in which a slide 36 is supported in a U-shaped frame 12 by a plurality of conventional recirculating bearing assemblies 38, one located adjacent each corner of slide 36. Each recirculating bearing assembly 38 is affixed to slide 36 by conventional means such as, for example, one or more pins 40 and screws 42. Each recirculating bearing assembly 38 includes a racetrack path 44 substantially filled with a plurality of bearings 46. Racetrack path 44 includes a load-bearing portion 48, first and second end portions 50 and 52, and a return portion 54. Load-bearing portion 48 in each recirculating bearing assembly 38 conventionally is finely ground and polished, whereas end portions 50 and 52 and return portion 54 are less well finished.

As slide 36 moves rightward, for example, in FIG. 4, bearings 46 roll without slipping between load-bearing portion 48 in each recirculating bearing assembly 38 and its facing groove in thick arm 16 or thin arm 18. As bearings 46 pass the left end of load-bearing portion 48, they are replaced by other bearings 46 entering at the right end of load-bearing portion 48. Motion in the leftward direction produces similar motion of bearings 46 but in the opposite direction. The continual replacement of bearings 46 returned through return portion 54 permits linear motion of slide 36 over a distance not limited by the length of slide 36, but by the length of U-shaped frame 12. Thus, the length and mass of slide 36 may be reduced without sacrificing linear travel and cantilevered masses are substantially eliminated.

The apparatus of FIG. 4, although solving the problem of long slides and cantilevered slide support, still is not ideal. Tolerances in pins 40 and screw 42 prevent alignment of load-bearing portions 48 in both recirculating bearing assemblies 38 on the same side of slide 36 with the accuracy attainable by the technique of grinding a single groove as in the referenced patent. Also, it is not possible to attain relative positions of the load-bearing portions 48 of the pair of recirculating bearing assemblies 38 at one end of slide 36 with those of the other pair of recirculating bearing assemblies 38 at the other end of slide 36 with the precision attainable by grinding grooves in the edges of a one-piece slide.

Referring now to FIG. 5, there is shown, generally at 56, a short-slide positioning table according to an embodiment of the invention. A thick arm 58 and a thin arm 60 are joined by a base 62 to form a U-shaped frame 64. A slide 66 is supported between thick arm 58 and thin arm 60 by first and second integral recirculating bearing assemblies 68 and 70. Integral recirculating bearing assembly 68 includes a groove 72 formed in the edge of slide 66. Similarly, integral recirculating bearing assembly 70 includes a groove 74 formed in the opposed edge of slide 66. It will be clear to one skilled in the art that, since grooves 72 and 74 are formed in opposed edges of slide 66, their relationships to slide 66 and to each other are controllable with the same precision attainable in the apparatus of FIGS. 1-3. Integral recirculating bearing assemblies 68 and 70 are identical, and thus a description of integral recirculating bearing assembly 68 is sufficient for full disclosure of the invention.

Referring now also to FIG. 6, a slotted groove 78, disposed in thick arm 58, includes an ogival-shaped portion 80 with a rectangular slot 82 centered therein. A ball-guide blade 84 is affixed in a recess 86 in slide 66 using, for example, rivets 88. A pick-up tooth 90 of ball-guide blade 84 is disposed in rectangular slot 82 with a curved inner surface 92 beginning at a level below the bottoms of bearings 32 in slotted groove 78 and ending beyond an extremity of an integral ball-return channel 94 passing through slide 66. A tapered end portion 96 of groove 72 is tapered inward, away from slotted groove 78, beginning at a point indicated by a line 98, at a small angle of, for example, about 1 degree relative to the remainder of groove 72. This taper gradually releases bearings 32 during leftward motion of slide 66 and gradually captures bearings 32 during rightward motion of slide 66. A curved portion 100, together with curved inner surface 92, retains bearings 32 while they move from groove 72 to integral ball-return channel 94. Once the preload forces on bearings 32 are released by the taper of tapered end portion 96, a relatively loose fit of bearings 32 can be tolerated.

Many different designs may be employed for returning bearings 32 to the upstream end of slide 66 after they are released from the downstream end, of which the illustrated embodiment wherein integral ball-return channel 94, consisting of a hole through slide 66, is only one. Instead of a hole through slide 66, integral ball-return channel 94 may be a tube (not shown) passing external to slide 66 or passing through an enlarged hole in slide 66. Ball-guide blade 84 may be a flat blade, as shown, disposed opposed to great circles of bearings 32. Alternatively, a J-shaped cross section may be employed to permit mounting a perimeter of recess 86 upon a surface of slide 66 and relying on the J shape to dispose an edge corresponding to curved inner surface 92 at the level of the great circles of bearings 32. Alternatively, each end of integral recirculating bearing assembly 68 may be fitted with an end assembly (not shown) having a cover plate and means for turning bearings 32 from groove 72 to integral ball-return channel 94.

Referring now to FIG. 7, a portion of an embodiment of a slide 102 is shown wherein first and second contact portions 104 and 106 near ends of one edge thereof are separated by a force-relief portion 108 set back from contact portions 104 and 106. The setback of force-relief portion 108 is sufficient to reduce bearing preloading in this region to near zero. The setback distance may be only a few thousandths of an inch to accomplish substantially complete force relief. Tapered transition regions 110 and 112 provide easy release and capture of bearings 32 (FIG. 6) entering and leaving force-relief portion 108. In addition, tapered end portions 114 and 116 provide easy release and capture of bearings 32 entering and leaving contact portions 104 and 106 from end assemblies (not shown). A corresponding shape may be employed on the opposed edge (not shown) of slide 102. Alternatively, one edge of slide 102 may have a plurality of contact regions separated by relief regions as shown, with the other edge having a single contact region corresponding to the embodiment of the invention shown in FIGS. 5 and 6.

The embodiment of the invention in FIG. 7 has the advantage that preloading forces are localized along relatively short lines of contact. In some applications it may be easier to control uniformity of preloading forces with such short lines of contact. The precision advantage of the prior-art positioning table disclosed in the referenced patent is not lost, however, since all bearing grooves in slide 102 are formed in a one-piece slide. Surface precision in force-relief portion 108 is a matter of indifference since no preloading forces are applied in this region. All additional elements required for returning bearings 32 from downstream end to upstream end of slide 102 may similarly be of low precision so long as surface roughness does not retard free travel of bearings 32.

It should be repeated here that bearings 32, represented by spherical balls, may be replaced with suitable bearing rollers without departing from the scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A positioning table comprising:
   a U-shaped frame having first and second substantially parallel arms;
   a first groove in an inner surface of said first arm;
   a slide disposed between said first and second arms;
   a second groove in a first edge of said slide;
   said second groove being disposed parallel to and facing said first groove;
   a first plurality of bearings mutually engaging said first and second grooves;
   a third groove in an inner surface of said second arm parallel to and facing said first groove;
   a fourth groove in a second edge of said slide opposite said first edge, said second groove facing said third groove;
   a second plurality of bearings mutually engaging said third and fourth grooves;
   means for permitting said slide to move along an axis parallel to said first and second grooves;
   means for returning said first plurality of bearings released from a downstream end of said first and second grooves to an upstream end thereof;
   means for returning said second plurality of bearing released from a downstream end of said third and fourth grooves to an upstream end thereof; and
   said first and second grooves, and said third and fourth grooves accepting preload forces from said first and second pluralities of bearings therebetween.

2. A positioning table according to claim 1 wherein said at least a second groove includes a contact portion and first and second tapered end portions at opposed ends of said contact portion, said first and second tapered end portions being angled away from said first groove at an angle effective for easing exit and entry of said bearings from said contact portion.

3. A positioning table according to claim 1 wherein said means for returning includes:
 first means for turning said bearings in a direction 180 degrees from a direction of travel in said second groove;
 a return tube receiving said bearings from said from said first means for turning; and
 second means for turning bearings received from said return tube parallel to said direction of travel.

4. A positioning table according to claim 3 wherein said first means for turning includes;
 a pickup groove in a center of said first groove;
 a ball-guide blade;
 a pick-up finger on said ball-guide blade extending into said pickup groove; and
 a curved surface on said ball-guide blade effective for guiding said bearings exiting from between said first and second grooves to said return tube.

5. A positioning table according to claim 3 wherein said return tube is a hole in said slide.

6. A positioning table comprising:
 a U-shaped frame having first and second substantially parallel arms;
 a first groove in an inner surface of said first arm;
 a slide disposed between said first and second arms;
 a second groove in a first edge of said slide;
 said second groove being disposed parallel to and facing said first groove;
 a first plurality of bearings mutually engaging said first and second grooves;
 a third groove in an inner surface of said second arm parallel to and facing said first groove;
 a fourth groove in a second edge of said slide opposite said first edge, said second groove facing said third groove;
 a second plurality of bearings mutually engaging said third and fourth grooves;
 means for permitting said slide to move along an axis parallel to said first and second grooves;
 means for returning said first plurality of bearings released from a downstream end of said first and second grooves to an upstream end thereof;
 means for returning said second plurality of bearings released from a downstream end of said third and fourth grooves to an upstream end thereof;
 said second groove including first and second spaced-apart contact portions;
 a force-relief portion in said second groove between said first and second contact portions;
 said force-relief portion including a first transition region adjacent said first contact portion;
 said first transition portion being angled to provide easy transition for bearings between said force-relief portion and said first contact portion;
 said second transition portion being angled to provide easy transition for bearings between said force-relief portion and said second contact portion; and
 said force-relief portion being spaced away from said first groove a distance effective to relieve bearing forces therefrom, whereby substantially all bearing forces are supported by said first and second contact portions.

7. A positioning table according to claim 6, wherein:
 said fourth groove including third and fourth spaced-apart contact portions;
 a second force-relief portion in said fourth groove between said third and fourth contact portions;
 said second force-relief portion including a third transition region adjacent said third contact portion;
 said third transition portion being angled to provide easy transition for bearings between said second force-relief portion and said third contact portion;
 said fourth transition portion being angled to provide easy transition for bearings between said second force-relief portion and said fourth contact portion; and
 said second force-relief portion being spaced away from said third groove a distance effective to relieve bearing forces therefrom, whereby substantially all bearing forces on said fourth groove are supported by said third and fourth contact portions, and said slide is supported at four spaced-apart locations defined by said first, second, third and fourth contact portions.

8. A positioning table according to claim 6 wherein:
 said second groove includes a first tapered end portion between a first end of said slide and said first contact region;
 said first tapered end portion being angled to provide easy transition for said bearings into and out of said first contact region;
 said second groove includes a second tapered end portion between a second end of said slide and said second contact region; and
 said second tapered end portion being angled to provide easy transition for said bearings into and out of said second contact region.

* * * * *